United States Patent
Lühmann

(10) Patent No.: US 6,245,177 B1
(45) Date of Patent: Jun. 12, 2001

(54) USE OF A PIECE OF ADHESIVE FILM FOR A BONG WHICH CAN BE SEPARATED WITHOUT DAMAGE AND WITHOUT LEAVING A RESIDUE

(75) Inventor: Bernd Lühmann, Norderstedt (DE)

(73) Assignee: Beiersdorf AG, Hamburg (DE)

( * ) Notice: Subject to any disclaimer, the term of this patent is extended or adjusted under 35 U.S.C. 154(b) by 0 days.

(21) Appl. No.: 09/244,903

(22) Filed: Feb. 4, 1999

Related U.S. Application Data

(62) Division of application No. 08/618,707, filed on Mar. 20, 1996, now abandoned.

(30) Foreign Application Priority Data

Mar. 28, 1995 (DE) ............................................. 195 11 288

(51) Int. Cl.$^7$ ............................. B23B 31/00; A47F 7/14
(52) U.S. Cl. ........................ 156/182; 156/71; 156/247; 156/249; 156/344; 248/497; 248/477; 248/475.1; 248/467; 248/489; 248/476
(58) Field of Search ................................. 156/247, 249, 156/344, 579, 71, 182; 248/497, 477, 467, 489, 476

(56) References Cited

U.S. PATENT DOCUMENTS

| | | | |
|---|---|---|---|
| 4,041,575 | * 8/1977 | MacArthur | 248/467 |
| 4,228,982 | * 10/1980 | Sellera | 248/467 |
| 5,409,189 | 4/1995 | Luhmann | 248/205.3 |
| 5,605,313 | 2/1997 | Erickson et al. | 248/467 |

FOREIGN PATENT DOCUMENTS

| | | | |
|---|---|---|---|
| 42 33 872 | * 3/1994 | (DE) | C09J/7/02 |
| 92/11333 | 7/1992 | (WO) | C09J/7/102 |
| 94/21157 | 9/1994 | (WO) | A47G/1/17 |

* cited by examiner

Primary Examiner—Linda Gray
(74) Attorney, Agent, or Firm—Norris McLaughlin & Marcus

(57) ABSTRACT

Use of a piece of adhesive film for bonding
a) a plate (6) to an article (5) to be mounted or hung up in such a way that the bond can be separated again without damage and without leaving a residue, by means of
b) a double-sided adhesive film (1) having a tab (2) which projects from the adhesive join and which can be pulled in the direction of the bond plane to separate the bond, where
c) the plate (6) has a device (7) via which mounting or hanging can take place in a manner known per se, and where
d) the bonding is hidden to the viewer of the mounted or hung article (5), if appropriate by the article (5) itself.

6 Claims, 3 Drawing Sheets

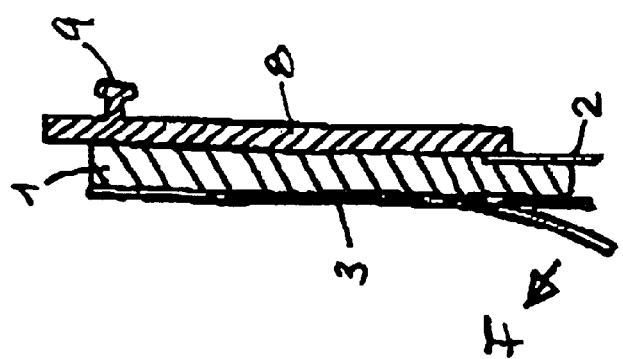
FIGURE 7
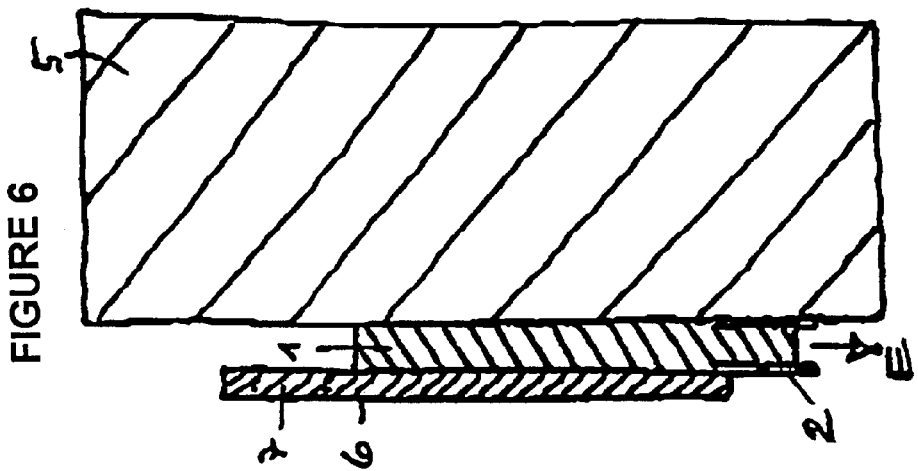
FIGURE 6
FIGURE 5
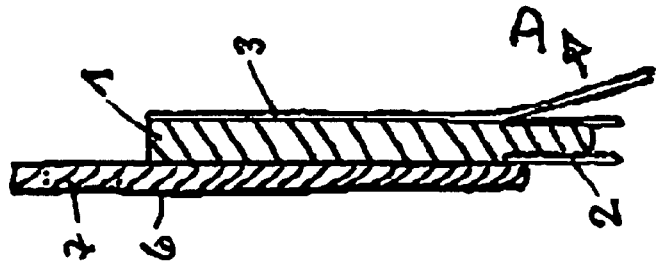
FIGURE 4
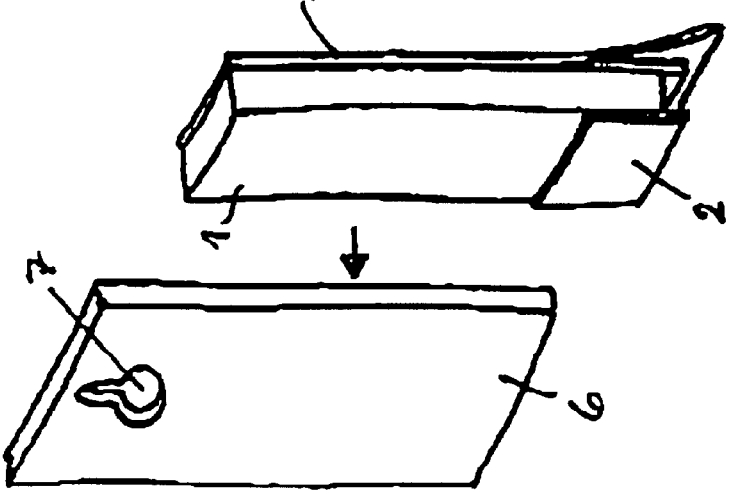

USE OF A PIECE OF ADHESIVE FILM FOR A BONG WHICH CAN BE SEPARATED WITHOUT DAMAGE AND WITHOUT LEAVING A RESIDUE

This is a divisional of U.S. Ser. No. 08/618,707, filed Mar. 20,1996, now abandoned.

BACKGROUND OF THE INVENTION

1. Field of the Invention

The invention relates to the use of a piece of adhesive film for a bond which can be separated without damage and without leaving a residue, and to corresponding adhesive bonds.

2. Description of Related Art

Adhesive films which can be detached by pulling in the bond plane are known and are commercially available, for example as Power Strips® (stretch-release adhesive tape) from Beiersdorf AG.

U.S. Pat. No. 4,024,312, for example, describes a self-adhesive tape having an extensible and elastic support made from a block copolymer, in particular for applications in the medical area, where pain-free removal from the skin is desired.

Furthermore, DE 33 31 016 A1 describes an adhesive film for temporary adhesive bonds which allows an adhesive bond produced therewith to be separated by pulling on the adhesive film in the direction of the bond plane. Adhesive films of this type allow high adhesive strengths and shear strengths to be achieved and adhesive sandwich systems to be separated again without further aids, in a comparable manner to the opening of a preserving jar, where the rubber seal is pulled out of the sealing join via the tab.

Furthermore, DE 37 14 453 C1 describes a practice explosive charge which is temporarily attached to a practice object by means of an adhesive film of this type and can be removed from the practice object without damage.

Furthermore, WO 92/11333 describes, inter alia, adhesive films for corresponding applications where the adhesive films employed have low elasticity at the same time as high extensibility.

DE 42 22 849 C1 likewise describes a strip of adhesive film of this type with a specially designed tab.

Finally, DE 42 33 872 C2 and WO 94/21157 describe redetachable self-adhesive hooks which are likewise provided with adhesive films of this type and are thus redetachable.

However, the adhesive systems described in the above patent specifications also have a number of disadvantages:

In order to facilitate removal of the adhesive film from the bond join, part thereof must project therefrom in the form of a tab. The adhesive film is thus necessarily not completely invisible in the case of the bonding of inflexible objects, but rather the tab is visible, which can appear unattractive and can also result in technical problems when materials which age on exposure to light are used.

During bonding, the entire adhesive film, i.e. including the tab, can easily disappear into the bond join. This can happen, particularly to the inexpert user, if he does not place a piece of adhesive film of this type on the edge of the substrate in such a way that a tab sticks out and then projects out of the bond join. It is then hard to know what to do to release the bond, and destruction, at least of one substrate, can be the consequence.

If the adhesive films tear during the release process and a torn piece of adhesive film remains completely inside the bond join, separation of the bonded materials without leaving a residue and without destruction of bond partners is usually no longer possible, which can cause considerable damage.

It therefore remains an unsolved problem of how valuable articles or those which are to remain undamaged, in particular should not be drilled through, can be attached reversibly and without damage and can be detached again without leaving a residue. For example, children's glass paintings, decorative tiles, but also heavier articles, are to be hung up temporarily, if possible without a visible tab or a similar foreign body extending beyond or projecting from the bond join. The object of the invention was to provide a solution here.

SUMMARY OF THE INVENTION

Accordingly, the invention relates to the use of the adhesive film pieces described at the outset, as characterized in greater detail in the patent claims, and to adhesive sandwich systems characterized in greater detail therein.

Regarding the adhesive film pieces to be employed, reference is made to the cited prior art.

Detachment of the bonded articles is achieved by stretching the double-sided adhesive tape. The loss of adhesion which occurs is favoured by reducing the tack of the contact-adhesive composition analogously to DE 33 31 016 or DE 42 22 849, and by reducing the adhesive film thickness, caused by the stretching of the adhesive film.

For the use of adhesive film pieces with a backing, particularly suitable products are those of the type as in WO 92/11333.

There are many ways of producing the nonadhesive areas for tabs, for example by rendering the contact-adhesive composition inert by means of a non-tacky coating or by lamination with thin layer materials, such as plastic films and papers.

Suitable covering paper or release laminates are conventional release films and release papers, for example silicone-treated release films/release papers, which are usually employed as sheet-like media which have good release properties vis-a-vis contact-adhesive compositions.

Regarding the production, processing and handling of the particularly preferred adhesive films, reference is made in general terms to DE 33 31 016, DE 42 22 849 and WO 92/11333.

In the examples below, the invention is described with reference to illustrative embodiments without this representing an unnecessary restriction. In the figures,

BRIEF DESCRIPTION OF THE DRAWINGS

The invention will now be described in further detail with reference to the drawings, wherein:

FIG. 4 shows a plate provided with a piece of adhesive film in accordance with the invention, FIG. 5 shows a diagrammatic side view of an adhesive sandwich system as shown in FIG. 4, FIG. 6 shows a diagrammatic side view of an article provided with an adhesive sandwich system as shown in FIG. 5, FIG. 7 shows a diagrammatic side view of a hook plate.

DETAILED DESCRIPTION OF THE INVENTION

Figure 3:
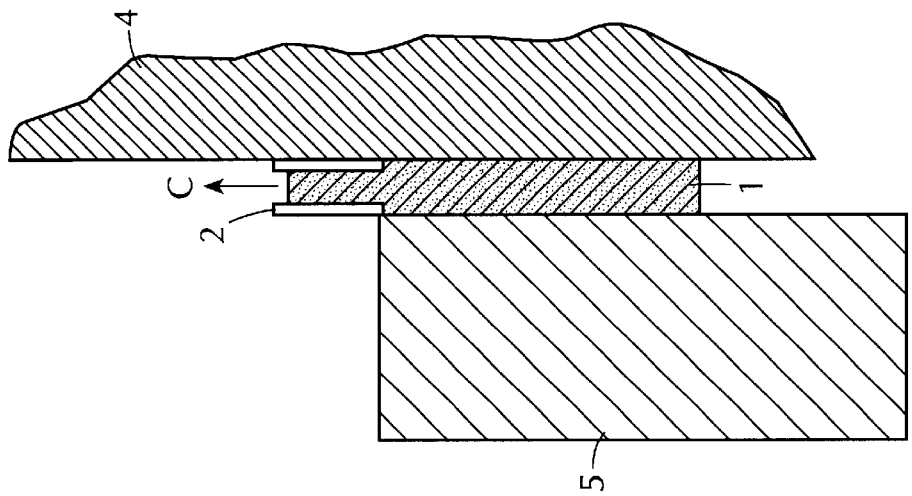
FIGS. 1–3 show a prior-art adhesive sandwich system.
Figure 2:
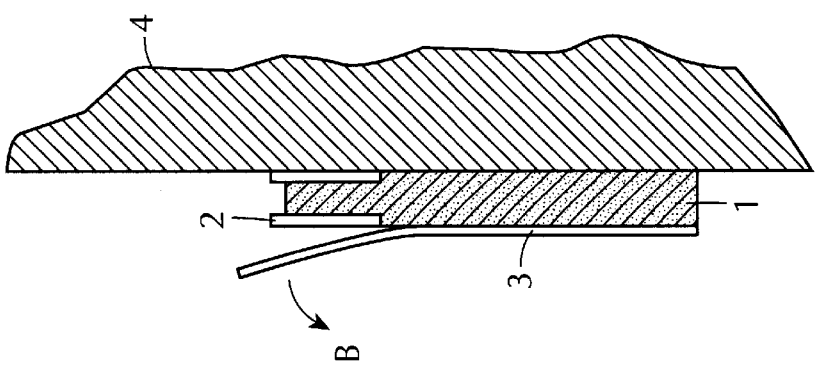
Figure 1:
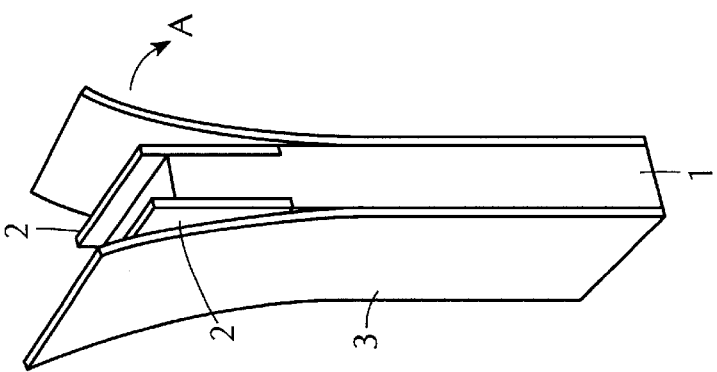

FIG. 1 shows a known piece of adhesive film, as commercially available under the name Power Strips® (stretch-release adhesive tape). This comprises an adhesive composition 1 with a tab 2, namely covers arranged on both sides at one end of the adhesive composition 1, and a cover paper 3 on both sides of the adhesive composition 1. Removal of one cover paper 3 in the direction of the arrow A uncovers one side of the adhesive composition 1. By means of this adhesive side, the piece of adhesive film can be bonded to a substrate, for example a wall 4, as shown in FIG. 2. The other cover paper 3 can then be peeled off in the direction of the arrow B, uncovering the underlying adhesive side. An article 5 can be bonded thereto in such a way that the tab 2 projects from the adhesive join. A strong, load-bearing and durable bond is achieved, but can be separated again without leaving a residue by pulling on the tab 2 in the direction of the arrow C, as shown in FIG. 3. The only drawback is that the article 5 must be supported or secured so that it does not eventually fall off and break.

FIGS. 1 to 3 show the prior art.

FIGS. 4–9 show novel embodiments. For example, FIG. 4 firstly again shows a known piece of adhesive film comprising adhesive composition 1, tab 2 and cover paper 3 from which one cover paper has already been removed as described under FIG. 1. The piece of adhesive film is bonded to a plate 6 by means of the side on which the adhesive composition 1 is thus uncovered. This plate 6 has a slotted hole 7 which remains free during this operation. The side view of this adhesive sandwich system as shown in FIG. 5 shows how the cover paper 3 can be peeled off in the direction of the arrow D in order to bond this adhesive sandwich system in turn to an article 5, FIG. 6. This sandwich system can be hung up via the slotted hole 7 or secured, for example, by passing a cord through the slotted hole 7 in order to hang the sandwich system thereon, or, for example, by pushing the sandwich system over the slotted hole 7 onto the head of a nail, screw or the like in the wall and hung thereon. This ensures a strong structure which can also be hung up securely even if the article 5 is heavy without even part of the bond arrangement being visible. In addition, separation of the adhesive sandwich system is possible without damage and without leaving a residue by first taking down the sandwich structure and then pulling on the tab 2 in the direction of the arrow E, leaving the article 5 without damage, and also the plate 6, which can be re-used together with a fresh piece of adhesive film.

Figure 8:
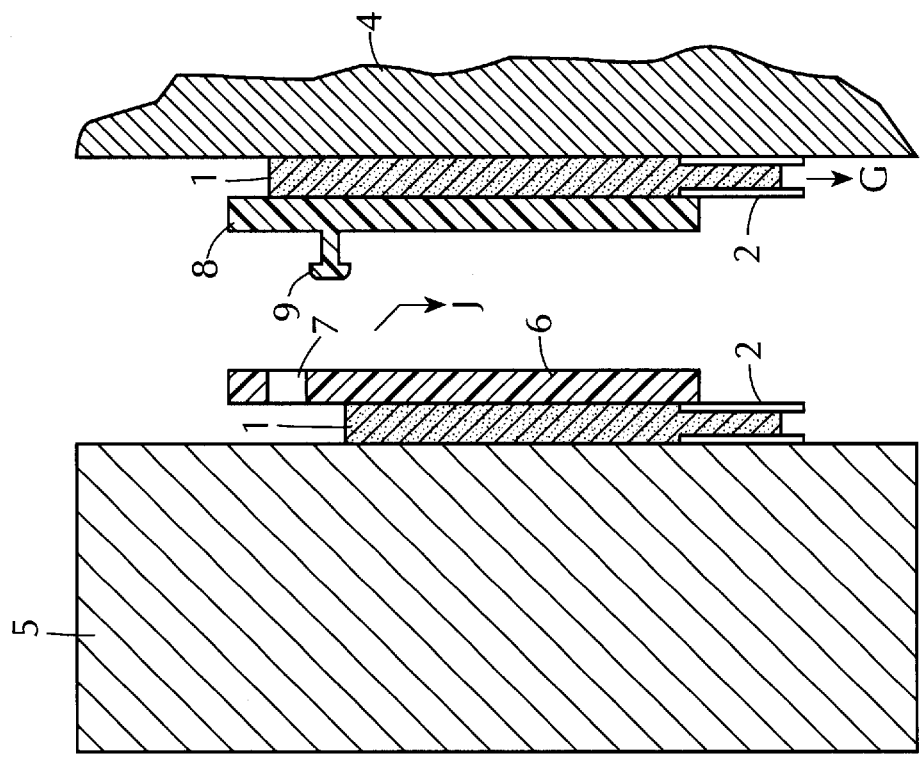
FIG. 8 shows a diagrammatic side view of the hook plate in FIG. 7 bonded to a wall and brought together with an article provided with adhesive sandwich system as shown in FIG. 6.
Figure 9:
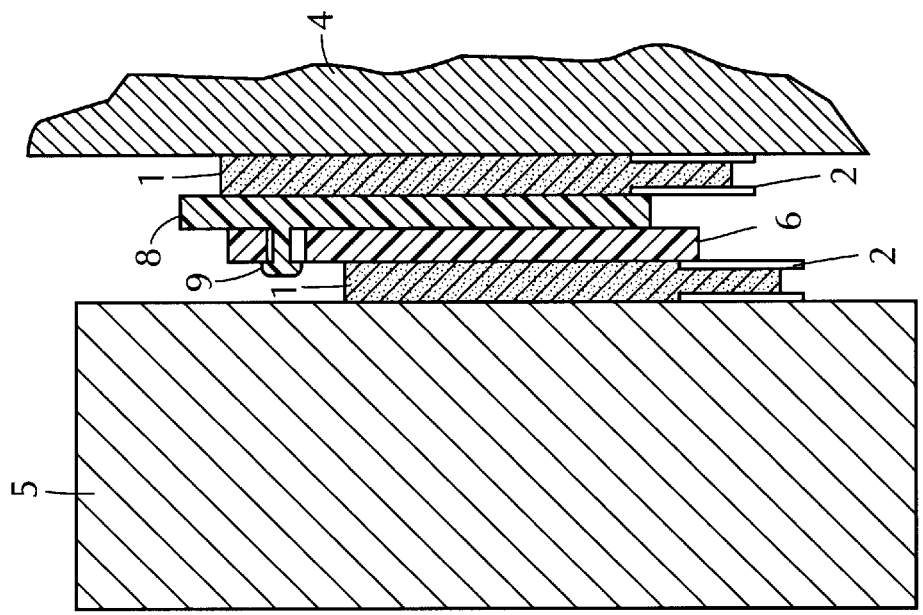
FIG. 9 shows a diagrammatic side view of a finished sandwich system of this type.

A further embodiment is shown in FIG. 7 below, in which a piece of adhesive film with adhesive composition 1, tab 2 and cover paper 3 is bonded to a hook plate 8, first described in DE 42 33 872 C. The hook plate 8 has a projecting hook 9, which fits into the slotted hole 7 in a plate 6 (FIG. 4), the hook 9 first being introduced into the round part of the slotted hole 7 and then being slidable with its narrower part into the slot part of the slotted hole 7, so that the hook 9 is thus safeguarded against unintentional removal from the slotted hole 7. The cover 3 is peeled off from this adhesive sandwich system in the direction of the arrow F, and the adhesive sandwich system is then stuck to a wall or the like, as shown in FIG. 8, to which it is fixed firmly and is able to support heavy loads, but, if required, can be removed again easily and without leaving a residue by pulling on the projecting tab 2 in the direction of the arrow G. The hook plate 8 can then be reused and can be provided with a fresh piece of adhesive film. A preassembled sandwich system as shown in FIG. 6 comprising article 5 with a piece of adhesive film comprising adhesive composition and tab 2 stuck thereto and a plate 6 with slotted hole 7 stuck thereto can then be mounted, initially in the direction of the arrow J, on the preassembled hook plate 8 as shown in FIG. 8. This connection can be separated again in the reverse manner. FIG. 9 shows the assembled system hung on the wall 4, the manner of attachment and hanging being invisible and removable for all parts without damage and without leaving a residue, it being possible for the hook plate 8 and the plate 6 to be re-used.

Suitable materials for the plate 6 and the counterholder, such as the hook plate 8, are plastic (transparent or opaque; polyolefins, such as PE, PP, PS; polyester; PMMA; polycarbonate; PVC; Resopaltm (reinforced plastic), etc.), and also wood and painted wood or glass and metal.

The novel use can involve an attachment device, for example an eye or a slotted hole 7 of a plate 6 for attaching a cord or the like, projecting above the article to be attached, but in particular this plate 6 can be bonded in a hidden manner.

EXAMPLE 1

A rectangular painted glass sheet (measuring 18 cm×12 cm) is provided on the reverse with two adhesive eyes which allow the plate to be fixed via two nylon cords attached thereto.

Each of the adhesive eyes comprises a rectangular strip of PMMA measuring 65 mm×25 mm and with a thickness of 0.8 mm. The PMMA strip has at one end a hole whose centre is 12.5 mm from each of the sides and from one end of the PMMA strip. The PMMA strip also has an integrated adhesive film measuring 50 mm×20 mm. The adhesive film is attached to the side opposite the end of the PMMA strip with the hole in such a way that the tab (14 mm×20 mm) is opposite the side of the PMMA strip with the hole and extends 10 mm below its lower edge. The adhesive film is covered with a nonstick release paper (cf. FIG. 4). Here and in the examples below, Power Strips® (stretch-release adhesive tape) from Beiersdorf AG, Hamburg, are used.

In order to apply the adhesive eyes to the glass plate, the release papers are removed from two adhesive eyes. The adhesive eyes are then stuck to the left and right of the reverse of the glass plates in such a way that the holes are about 10 mm above the upper edge of the glass plate.

By means of the abovementioned adhesive eyes, the painted glass plate can easily be attached by via two nylon cords to a metal hook mounted on the wall.

In order to remove the adhesive eyes from the reverse of the glass plate without leaving a residue, the glass plate is taken down from the wall and the adhesive film is pulled out, starting from the tab strip, by pulling parallel to the adhesive plane. If a new adhesive strip is available, the body of the adhesive eyes can be re-used.

EXAMPLE 2

An ellipsoidal brass plate measuring 30 cm (maximum diameter)×18 cm (minimum diameter) is provided with an adhesive eye as described in Example 1 in such a way that the latter is completely hidden behind the brass plate. The brass plate can be attached via a nylon tape to a hook mounted on a wall and located above the brass plate. The adhesive eye can be detached from the glass plate as described in Example 1.

EXAMPLE 3

The brass plate from Example 2 is attached directly via the hole of the adhesive eye to a hook mounted on the wall. In this case, both the adhesive eye and the hook mounted on the wall remain invisible behind the brass plate.

What is claimed is:

1. A method of mounting or hanging an article on a surface, said method comprising the following steps:
   a) providing a first plate, which contains a projection;
   b) providing a second plate, which is not identical to said first plate, said second plate comprising front and rear flat faces, and a hole extending through said front and rear flat faces, said hole being capable of accepting said projection;
   c) adhering one of said first plate or said second plate to said article using a first piece of double-sided adhesive film; and
   d) adhering the other of said first plate or said second plate to said surface using a second piece of double-sided adhesive film; and
   e) placing said projection in said hole;
wherein:
   steps a) through e) are carried out in any order;
   said first piece of double-sided adhesive film comprises a tab which projects from one end thereof, which tab can be pulled in the direction of the bond formed when said first piece of double-sided adhesive film is adhered to said article or said surface to break said bond;
   said second piece of double-sided adhesive film comprises a tab which projects from one end thereof, which tab can be pulled in the direction of the bond formed when said second piece of double-sided adhesive film is adhered to said article or said surface to break said bond; and
   after the article is mounted or hung on said surface, the bonds and the tabs are hidden to a viewer of the article.

2. The method according to claim 1, wherein said first piece of double-sided adhesive film and/or said second piece of double-sided adhesive film is elastically or plastically stretchable with or without a backing.

3. The method according to claim 1, wherein the adhesion of said first piece of double-sided adhesive film and/or said second piece of double-sided adhesive film is lower than the cohesion thereof, the adhesive strength of said first piece of double-sided adhesive film and/or said second piece of double-sided adhesive film substantially disappears on stretching, and the ratio between peel force and tear strength of said first piece of double-sided adhesive film and/or said second piece of double-sided adhesive film is at least 1:1.5.

4. The method according to claim 1, wherein said first piece of double-sided adhesive film and/or said second piece of double-sided adhesive film is based on thermoplastic rubber and tackifying resins.

5. The method according to claim 1, wherein said first plate is flat, said projection is a hook, and said hook is in an upper region of said first plate.

6. The method according to claim 1, wherein said first plate and/or said second plate are reusable.

* * * * *

UNITED STATES PATENT AND TRADEMARK OFFICE
CERTIFICATE OF CORRECTION

PATENT NO.    : 6,245,177 B1
DATED         : June 12, 2001
INVENTOR(S)   : Bernd Luhmann It is certified that error appears in the above-identified patent and that said Letters Patent is hereby corrected as shown below:

<u>Title page,</u>
Item [54], Title, change "BONG" to -- BOND --

Signed and Sealed this

Eleventh Day of February, 2003

JAMES E. ROGAN
*Director of the United States Patent and Trademark Office*